United States Patent [19]

Hara et al.

[11] Patent Number: 5,049,327

[45] Date of Patent: Sep. 17, 1991

[54] INJECTION MOLDING METHOD

[75] Inventors: Hitoshi Hara, Funabashi; Yorikazu Takeichi, Chiba, both of Japan

[73] Assignee: Sumitomo Heavy Industries, Ltd., Tokyo, Japan

[21] Appl. No.: 360,933

[22] PCT Filed: Jul. 20, 1988

[86] PCT No.: PCT/JP88/00719

§ 371 Date: Mar. 17, 1989

§ 102(e) Date: Mar. 17, 1989

[87] PCT Pub. No.: WO89/00489

PCT Pub. Date: Jan. 26, 1989

[30] Foreign Application Priority Data

Jul. 21, 1987 [JP] Japan .................. 62-179988
Oct. 5, 1987 [JP] Japan .................. 62-249867
Oct. 5, 1987 [JP] Japan .................. 62-249868

[51] Int. Cl.$^5$ ............................................ B29C 67/22
[52] U.S. Cl. .................. 264/45.5; 264/45.1; 264/51; 264/54
[58] Field of Search ............. 264/45.5, 51, 54, 45.1, 264/328.1

[56] References Cited

U.S. PATENT DOCUMENTS

| | | | |
|---|---|---|---|
| 4,065,410 | 12/1977 | Schafer et al. | 264/54 |
| 4,096,218 | 6/1978 | Yasuike et al. | 264/54 |
| 4,107,260 | 8/1978 | Dougherty | 264/54 |
| 4,181,647 | 1/1980 | Beach | 264/54 |
| 4,296,055 | 10/1981 | Harris | 264/45.5 |
| 4,473,516 | 9/1984 | Hunerberg | 264/45.5 |
| 4,674,170 | 6/1987 | Hubbert et al. | 264/45.5 |
| 4,683,247 | 7/1987 | Allen et al. | 264/45.5 |
| 4,769,397 | 9/1988 | Lapierre et al. | 264/45.5 |
| 4,892,681 | 1/1990 | Kolossow | 264/54 |

FOREIGN PATENT DOCUMENTS

| | | | |
|---|---|---|---|
| 48-012059 | 4/1973 | Japan | 264/45.5 |
| 57-14631 | 1/1982 | Japan | |
| 58-14725 | 1/1983 | Japan | |
| 58-134720 | 8/1983 | Japan | |
| 58-145739 | 8/1983 | Japan | |
| 59-220335 | 12/1984 | Japan | 264/45.5 |
| 61-239916 | 10/1986 | Japan | |
| 61-239917 | 10/1986 | Japan | |

Primary Examiner—Robert A. Dawson
Assistant Examiner—Allan R. Kuhns
Attorney, Agent, or Firm—Armstrong, Nikaido, Marmelstein, Kubovcik & Murray

[57] ABSTRACT

An injection molding method for forming molded products of foamed plastics, in which molten resin mixed with foaming agent which begins foaming after being kept at a required temperature for a required time is injected into a metal mold wherein the foaming agent mixed together with the molten resin is solidified in a body in the metal mold under such conditions that the portion of the foaming agent molten resin mixture which is in contact with the inner surface of the metal mold is accordingly cooled rapidly such as to substantially prevent foaming thereof, so that the appearance of the molded product is finished neatly, while the foaming agent/molten resin mixture in the inner part of the mold is cooled gradually so that the temperature thereof is not rapidly decreased, under conditions wherein the foaming agent begins foaming and the inner portion of the molten resin is therefore expanded from inside owing to the foaming pressure, which expansion substantially prevents the occurrence of depressions in the surface of the molded product which might otherwise be caused due to shrinkage upon cooling of the resin.

4 Claims, 9 Drawing Sheets

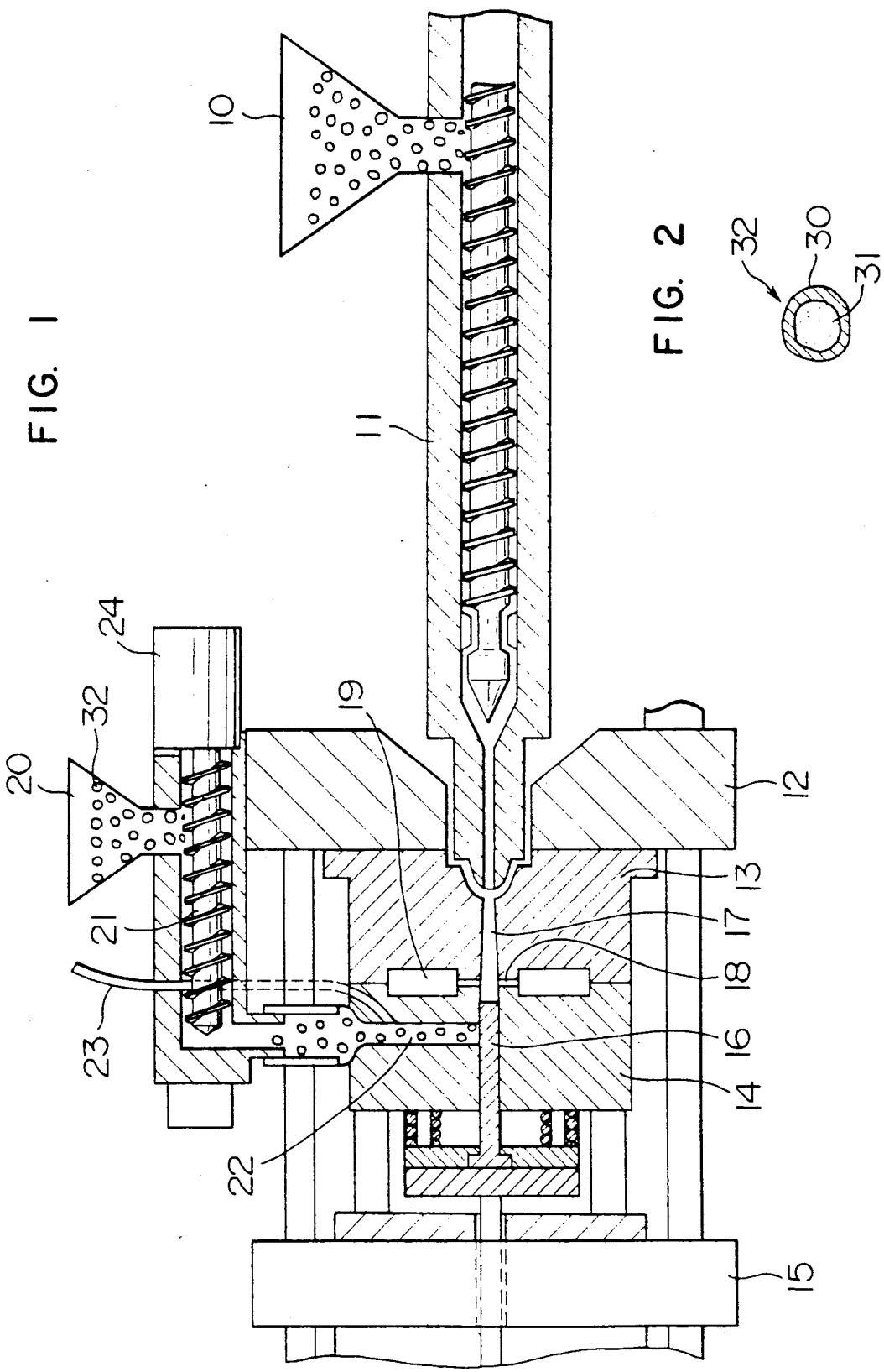

INJECTION MOLDING METHOD

DESCRIPTION

TECHNICAL FIELD

This invention relates to an injection molding method for forming molded products of foamed plastics.

BACKGROUND ART

Conventionally, an injection molding machine is known which comprises an injection mechanism for melting and injecting a material to be formed by injection molding such as, for example, a thermoplastic material or a thermosetting resin (referred to simply as "resin", hereinafter) by means of a heating cylinder which is provided with a screw (and/or a plunger), a mold clamping mechanism for clamping a metal mold with a high pressure, and a control mechanism for automatically operating these mechanisms, and which operates in such a manner that the resin is dropped from a hopper into the heating cylinder to be melted and mixed and kneaded, the resin thus heated and molten is forced (injected) into the metal mold at a high pressure by the forward movement of the screw and, after being cooled and solidified, is then released from the mold, thereby obtaining molded products.

When the resin which is melted by heating is injected into the metal mold, a part of the molten resin existing close to a surface of the metal mold (that is, a layer of resin which forms an outer portion of a molded product) 1 is cooled rapidly, while another part of the molten resin existing in the inner part of the metal mold (that is, a layer of resin which forms an inner part of the molded product) 2 is cooled gradually, as shown in FIG. 4, thereby causing shrinkage of the resin.

On the other hand, as shown in FIG. 5, the injection pressure 3 is maximized immediately after the commencement of the injection and decreases sharply upon the completion of filling of the mold with the resin (or when changed over to a hold pressure). To the contrary, the internal pressure 4 in the metal mold becomes sharply reduced when the molded product is taken out (or when the cooling is completed) although it is very high immediately after the completion of the filling of the mold with the resin. In short, the molten resin is subjected to very complicated variations in operations of parameters in that it contracts due to the compressing action of high injection pressure applied immediately after the commencement of the injection and it expands due to the decompressing action of the respective pressure mentioned above.

In this way, the molten resin suffers a difference in volume caused due to its complicated behavior mentioned above, or what is called "molding shrinkage", in the course of the injection molding operation. This molding shrinkage of the resin results in generation of surface depressions which seem to occur most frequently among defects of the molded products.

FIG. 6 is a sectional view for explanation of the principle of the generation of such depressions. In FIG. 6, a reference numeral 5 denotes a depression, and a numeral 6 denotes a part of the resin which was cooled rapidly, which forms the outer portion of the molded product and which exhibits the same temperature change as that of the part of molten resin 1 existing close to the surface of the metal mold shown in FIG. 4. A reference numeral 7 denotes another part of the resin which was cooled gradually and forms the inner portion (or the inner part of a large-thickness portion) of the molded product and which exhibits the same temperature change as that of the part of molten resin 2 existing in the inner part of the metal mold (or the layer of resin which forms the inner portion of the molded product) shown in FIG. 4 as well. The depression 5 is caused to occur by such a phenomenon that the part of resin 7 which was cooled gradually pulls down the part of resin 7 which was cooled rapidly.

In short, the depression referred to above is caused by the molding shrinkage resulting from the very complicated behavior of the molten resin as mentioned before and is accordingly considered to be a defect which has been very difficult to eliminate.

In order to prevent such depressions, there have hitherto been taken various measures such as, for example, a measure in which the molding is performed under conditions such that the injection pressure is increased and the temperature in the injection heating cylinder is lowered while the hold pressure is applied sufficiently; a measure in which the diameters of a sprue and a runner, particularly of a gate, are increased; and a measure in which the molded product and the metal mold are designed, so that it will be difficult for a depression to occur.

However, it is hard to say that every prior measure is a satisfactory and effective depression preventing measure because they are attended with technical difficulties and require annoying control means.

Incidentally, although not directly related to a depression preventing measure, a molding method is known in which a foaming agent is added to the resin to form the molded products of spongy plastics such as, for example, urethane foam and foam polyethylene. According to this method, the occurrence of depressions can be prevented due to increased pressure produced when foaming. However, since such foaming conventionally takes place even in the surface layer, the appearance of the molded product is not as good as would be desired.

Further, what is called a "sandwich molding method" is also known in which a first resin, for forming the surface layer, is first introduced into the mold under pressure and then another resin (combined with a foaming agent), for forming the inner part of the molded article, is introduced into the mold under pressure. According to this method, however, the necessity of provision of two molding machines makes the structure complicated, and the application of this method is limited to the forming of the molded products having a large thickness.

Accordingly, an object of the present invention is to provide an injection molding method for forming molded products of foamed plastics which is capable of preventing the occurrance of depressions and of neatly finishing the appearance of the molded products by making use of a novel measure that is entirely different from the conventional measures in which an excessively high injection pressure and hold pressure are applied.

DISCLOSURE OF INVENTION

In order to achieve the above-described object, according to the present invention, there is provided an injection molding method comprising the steps of: mixing a foaming agent, which begins foaming after being kept at a required temperature for a required time, into molten resin; pouring the molten resin mixed with the foaming agent into a metal mold; and causing only a part of the molten resin, which forms an inner part of a molded product and the cooling velocity of which is low, to effect foaming, without causing another part of the molten resin, which is in contact with an inner surface of the metal mold, and which will form a surface of the molded product and the cooling velocity of which is high, to effect foaming.

In the step of cooling and solidification of the molten resin mixed with the foaming agent and filled in the metal mold, the part of molten resin existing close to the inner surface of the metal mold (or the layer of resin for forming the surface of the molded product) 2 is cooled rapidly as shown in FIG. 4 so that the foaming agent mixed in the molten resin does not begin foaming at the temperature of this rapidly cooled resin. In consequence, the resin is solidified without causing the foaming agent to effect foaming in this part of the resin. As a result, it is possible to obtain a molded product the surface or the appearance of which is neat and even the strength of which is not deteriorated.

On the other hand, as shown in FIG. 4, the part of molten resin existing in the inner part of the metal mold (or the layer of resin which forms the inner part of the molded product) 2 is cooled gradually so that the temperature thereof is not rapidly decreased. Namely, the temperature of this part of resin is maintained higher than the temperature of the part of resin existing in the proximity of the surface of the metal mold. The foaming agent reacts at such high temperature to begin foaming. Owing to the foaming pressure produced during such foaming, the molten resin in the metal mold is expanded from inside. This expansion makes it possible to prevent the occurrance of depressions which might otherwise be caused due to shrinkage upon cooling of the resin.

BRIEF DESCRIPTION OF THE DRAWINGS

FIG. 1 is a sectional front view illustrating an outline of a first embodiment of an injection molding machine for carrying out an injection molding method according to the present invention;

FIG. 2 is a sectional view illustrating an example of foaming agent used in the injection molding method according to the present invention;

BEST MODE FOR CARRYING OUT THE INVENTION

Figure 3:
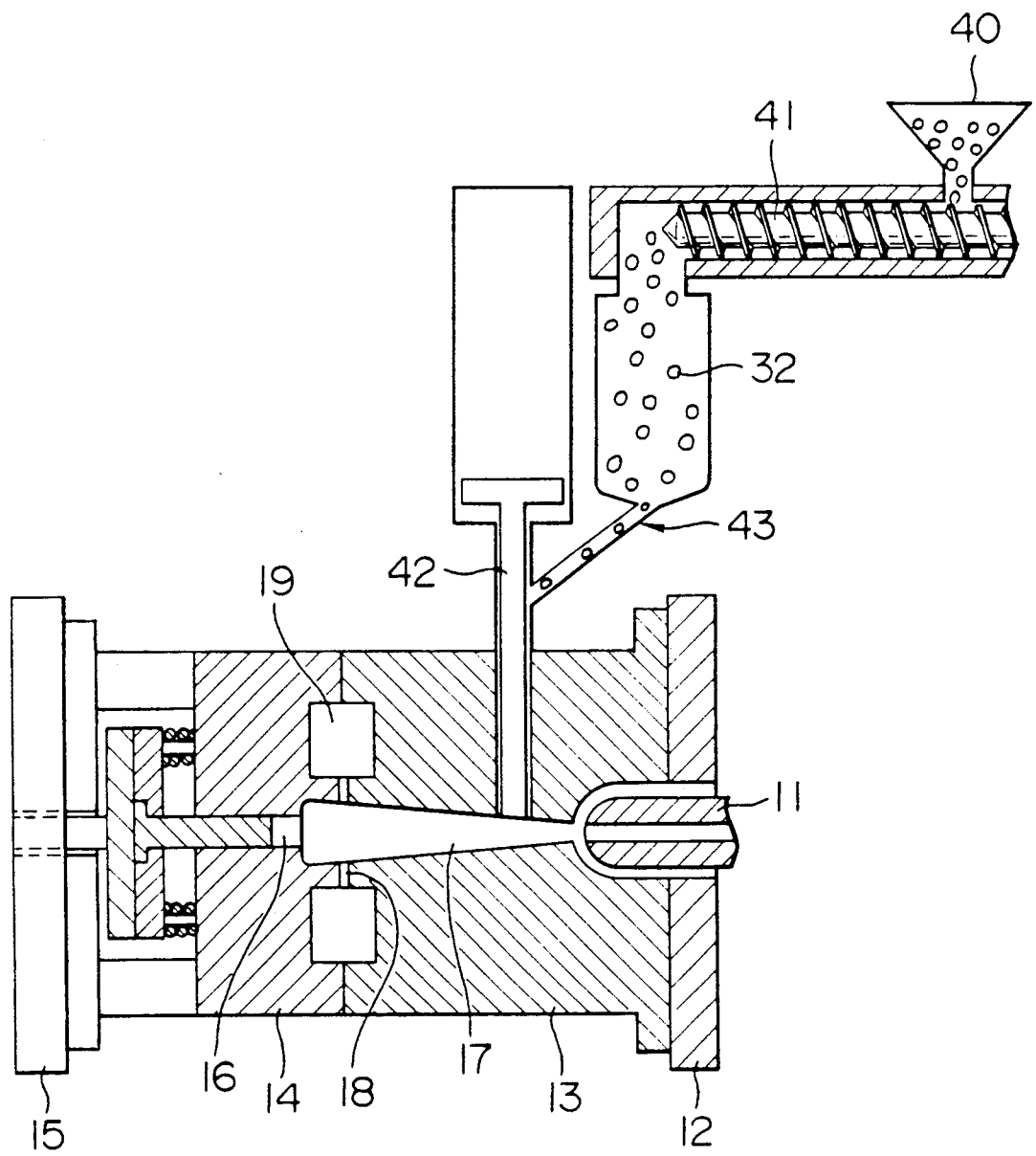
FIG. 3 is a sectional front view illustrating an outline of a second embodiment of the injection molding machine for carrying out the present invention.

FIG. 1 is a front view illustrating an outline of a st embodiment of an injection molding machine for carrying out present invention, in which reference numeral 10 denotes a per for supplying resin; 11, an injection heating cylinder which provided with a screw; 12, a fixed board; 13, a fixed metal d; 14, a movable metal mold; 15, a movable board; 16, an ejector 17, a sprue; 18, a runner; and 19, a metal mold cavity, these known elements constituting a molding machine body.

The injection molding machine applied to this embodiment constructed by attaching to the molding machine body described above a foaming agent mixing mechanism which is constituted by a per 20 for supplying foaming agent, a foaming agent extruding screw 21, a foaming agent mixing passage 22, formed to extend vertically from the forward end portion of the screw 21 so as to be communicated with an insertion hole of the ejector pin 16 passing through a portion of the movable metal mold 14, a foaming agent stirring air supply pipe 23, formed to be communicated with the passage 22, and a motor 24 for rotatively driving the screw 21.

For the foaming agent referred to above, a foaming agent of the type that exhibits differences in its foaming reaction as a function of differences in the rate of cooling of the molten resin filled in the metal mold cavity 19, that is, in such a manner that foaming is not effected at the temperature of a part of the resin which is subjected to a high rate of cooling (or at the temperature of the rapidly cooled molten resin part while foaming is effected at the temperature of another part of the resin which is subjected to a low rate of cooling (or at the temperature of the gradually cooled molten resin part 2), is used.

Specifically speaking, the following foaming agents are available, for example: a foaming agent 32 of the type which is made in such a manner that, as shown in FIG. 2, foaming substance 31 (such as azodicarboxylicacidamide or sodium bicarbonate) is coated with a coating agent 30 which becomes molten when heat is applied to maintain the temperature at above a certain level for a certain time, that is, when it is heated at a temperature above a certain specified temperature (or the temperature of the part of resin the cooling velocity of which is low) for a specific period of time, and is then solidified to be shaped into granules, or a foaming agent of the type in which the foaming reaction does not start until the foaming agent itself is heated to an elevated temperature (or the temperature of the part of resin the cooling velocity of which is low) (such as hydrazinedicarbonamide).

In the present embodiment, the foaming agent 32 which is coated as shown in FIG. 2 is used as the foaming agent.

Next, the injection molding operation according to the present embodiment will be explained.

Referring to FIG. I, the fixed metal mold 13 and the movable metal mold 14 are first clamped to each other, and the ejector pin 16 is then moved backward to allow the foaming agent mixing passage 22 to be communicated with the sprue 17 and the runner 18. Thereafter, the motor 24 is driven to rotate the extruding screw 21. Then, the foaming agent extruding screw 21 is rotated so that the coated foaming agent 32 accommodated in the hopper 20 is caused to drop into the movable metal mold 14 through the mixinq passage 22. In this case, in order to enable the coated foaming agent 32 to be fed smoothly from the passage 22 into the movable metal mold 14, that is, in order to prevent stagnation of the foaming agent 32, air is introduced into the passage 22 through the stirring air supply pipe 23 to stir the coated foaming agent 32. Subsequently, the molten resin in the heating cylinder 11 is forced under pressure into the metal mold cavity 19. In this case, melting and injection of the resin and mixing of the coated foaming agent 32 into the molten resin are effected on the same axis.

Thereafter, the molten resin mixed with the coated foaming agent 32 and filled in the metal mold cavity 19 is cooled and solidified in accordance with the general method of the prior art and, subsequently, is released from the mold.

Figure 4:
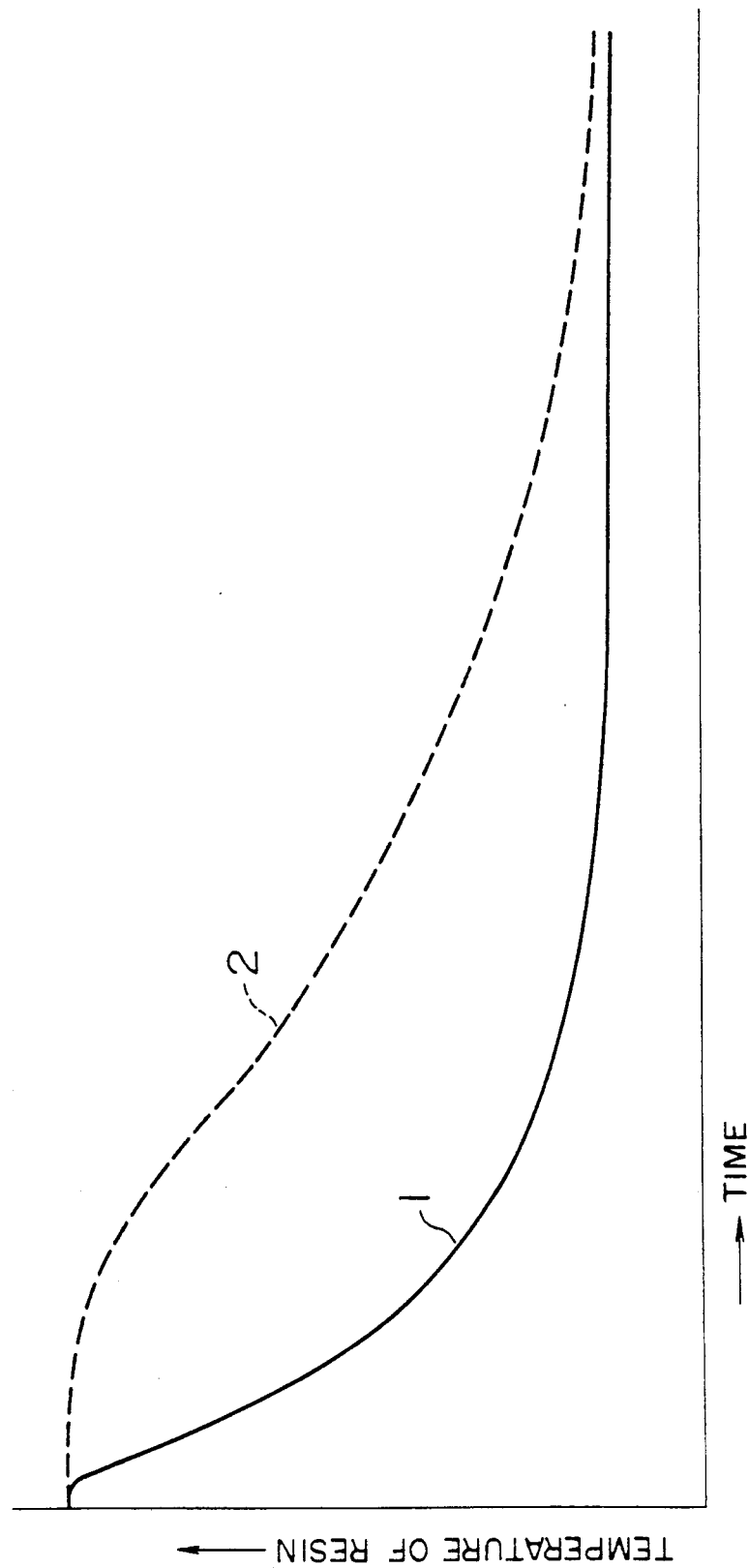
FIG. 4 is a graph showing the temperature change of molten resin in a metal mold.
Figure 5:
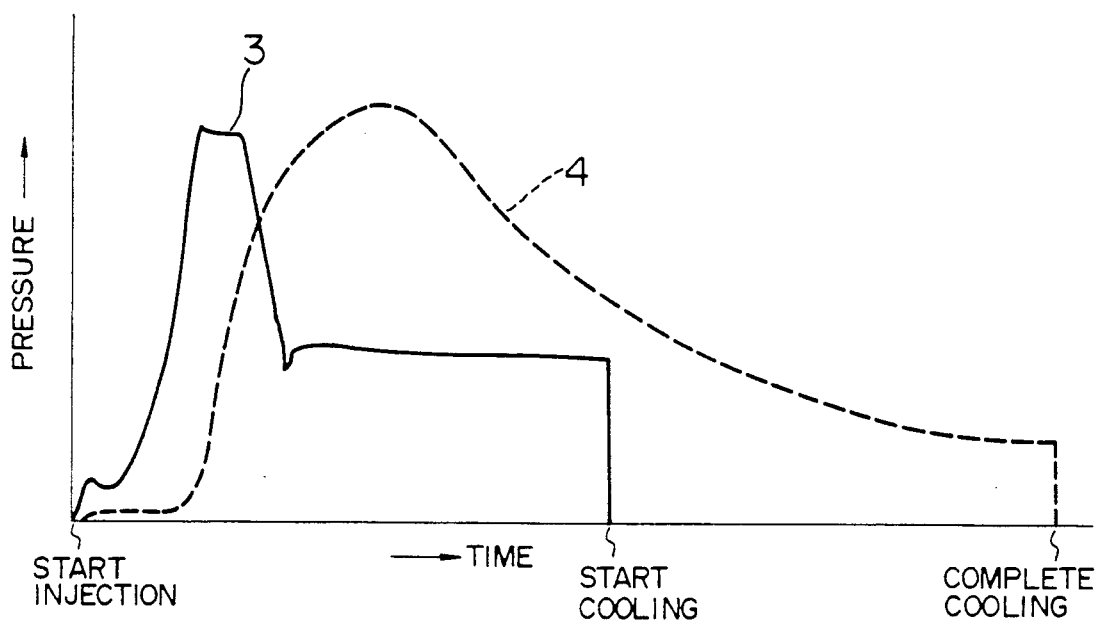
FIG. 5 is a graph showing the changes in injection pressure and metal mold internal pressure after the injection.
Figure 6:
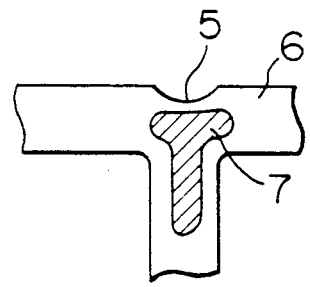
FIG. 6 is a sectional view for explanation of the principle of occurrence of depression in a conventional injection molding method.

In the step of cooling and solidification mentioned above, since a part of the molten resin which exists close to the surface of the metal mold cavity 19 is cooled rapidly as indicated by a solid line 1 shown in FIG. 4, the coating agent 30 which coats the foaming substance 31 as shown in FIG. 2 is not melted, with the result that the foaming agent 32 is not activated but rather is with the resin without starting the foaming. In consequence, the appearance of the molded product can be kept neat, as in the case of the molding of non-foamed plastics, and, in addition, there is no fear that the strength of the molded product is deteriorated. On the other hand, since another part of the molten resin which exists in the inner part of the metal mold cavity 19 is cooled gradually, as indicated by a broken line 2 shown in FIG. 4, the temperature thereof is not rapidly decreased so that the coating agent 30 shown in FIG. 2 becomes molten. This causes the foaming substance 31 to react; so that the foaming agent 32 begins foaming. The foaming pressure produced during such foaming eliminates the occurrence of the depression 5 which might otherwise be caused in molding of ordinary non-foamed plastics as a result of withdrawal of the previously solidified portion due to the shrinkage of the inner part of the resin upon cooling, that is, a depression of the rapidly cooled resin part 6 which appears in the surface of the molded product as shown in FIG. 6.

FIG. 3 is a sectional front view illustrating an outline of essential portions of a second embodiment of the injection molding machine for carrying out the present invention.

The injection molding machine used in the present embodiment has an arrangement of a molding machine body constituted by the same known elements as shown in Figure that is, the injection heating cylinder 11 provided with the screw, the fixed board 12, the fixed metal mold 13, the movable metal mold 1 4, the movable board 15, the ejector pin 16, the sprue 17, the runner 18 and the metal mold cavity 19, that has attached thereto a foaming agent mixing mechanism which is constituted by a hopper 40 for supplying the foaming agent, a foaming agent extruding screw 41, a foaming agent mixing piston 42 provided to extend vertically through a portion of the fixed metal mold 13 so as to be communicated with the sprue 17, a foaming agent mixing passage 43 formed to extend from the forward end portion of the screw 41 so as to be communicated with the foam-ing agent mixing piston 42, and a motor (not shown) for rotatively driving the screw 41

In the present embodiment, the foaming agent mixing piston 42 is first moved backward, the foaming agent 32 which is coated as shown in FIG. 2, for example, is then supplied from the hopper 40, and the molten resin is injected from the heating cylinder 11 while moving the piston 42 forwardly, thereby mixing the coated foaming agent 32 into the molten resin.

In other words, in the present embodiment, injection of the molten resin and supply of the foaming agent are effected on the same axis, and the coated foaming agent 32 is directly mixed into the molten resin flowing along this axis (or the sprue 17) from a direction perpendicular to the latter.

In this way, the molten resin mixed with the coated foaming agent 32 is filled into the metal mold cavity 19 and, after that, the same function and effect as the case shown in FIG. 1 are exhibited.

Figure 7:
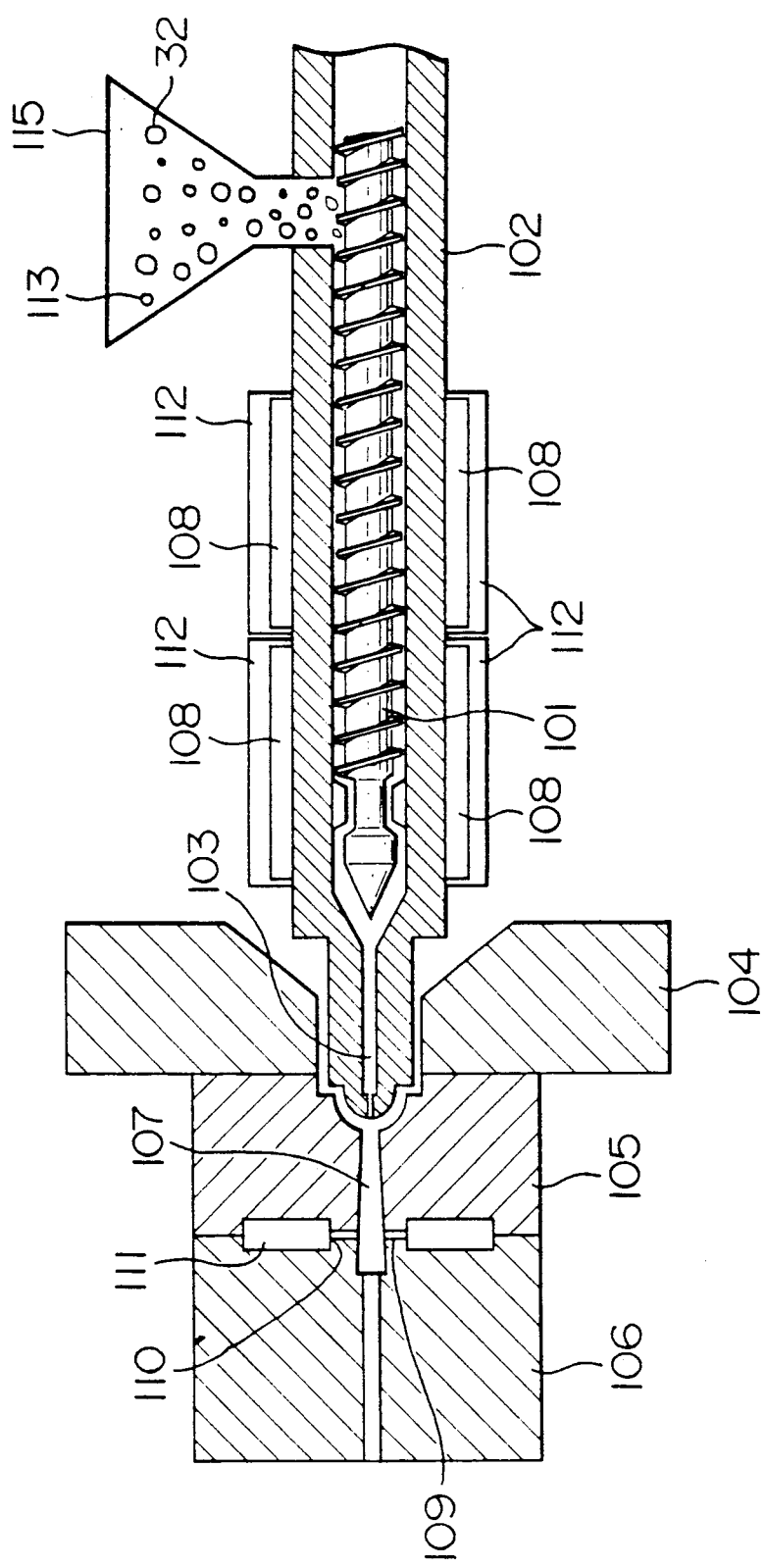
FIG. 7 is a sectional front view illustrating an outline of a third embodiment of the injection molding machine for carrying out the present invention.

FIG. 7 illustrates a third embodiment of the injection molding machine for carrying out the present invention, in which a molding machine body is constituted by known elements including an injection heating cylinder 102 provided with a screw 101, a nozzle 103, a fixed board 104, a fixed metal mold 105, a movable metal mold 106, a sprue 107, a heater 108, a runner 109, a gate 110, and a cavity 111.

The molding machine body described above has attached thereto a structure comprising cooling blower air passage 112 through which air is made to flow toward the heating cylinder 102 to absorb the heat liberated in the heating cylinder 102 by shearing action, and a hopper 115 for supplying resin 113 which serves as a molding material and the foaming agent 32.

Incidentally, as for the foaming agent 32 mentioned above, by making use of foaming agent 32 of the type that has a boiling point which is higher than the melting point of the resin 113 so that the resin is molten but the foaming agent 32 does not start the foaming reaction while plasticization of the resin is being effected in the heating cylinder 102, foaming agent 32 of the type that the temperature and retention time at that temperature required for beginning the foaming reaction are adjusted in accordance with the difference in the cooling rate of the molten resin filled in the cavity 111—thus, foaming is not effected at the temperature of a part of the resin the cooling rate of which is high (or at the temperature of the rapidly cooled part of the resin), while foaming is effected at the temperature of another part of the resin the cooling rate of which is low (or at the temperature of the gradually cooled part of the resin), is used.

Specifically speaking, foaming agent 32 of the type that is made in such a manner that, as shown in FIG. 2, a foaming substance 31 (such as azodicarboxylicacidamide or sodium bicarbonate) is coated with a coating agent 30 which is molten when heat is applied to maintain the temperature at above a certain level for a certain time, that is, when it is heated at a temperature above a certain specified temperature (corresponding to the temperature of the part of the resin the cooling rate of which is low) for a specific period of time, and which is made of a plastic material which is the same as the molding material but the melting point of which is made higher than that of the molding material by a necessary amount by increasing its molecular weight, and is then solidified and shaped into granules, is used.

Next, operation of the injection molding according to the present embodiment will be explained. First, the fixed metal mold 105 and the movable metal mold 106 are clamped to each other, and the resin 113 and the coated foaming agent 32 are then supplied from the hopper 115 so as to be mixed and kneaded with each other and dispersed in the heating cylinder 102 due to rotation of the screw 101, and, thereafter, the molten resin is injected through the nozzle 103, thereby mixing the coated foaming agent 32 into the molten resin.

Subsequently, the molten resin mixed with the coated foaming agent 32 is poured under pressure into the cavity 111, and after that, the molten resin mixed with the coated foaming agent 32 and filled in the cavity 111 is cooled and solidified in accordance with the general method of the prior art and is thereafter released from the mold.

Figure 8:
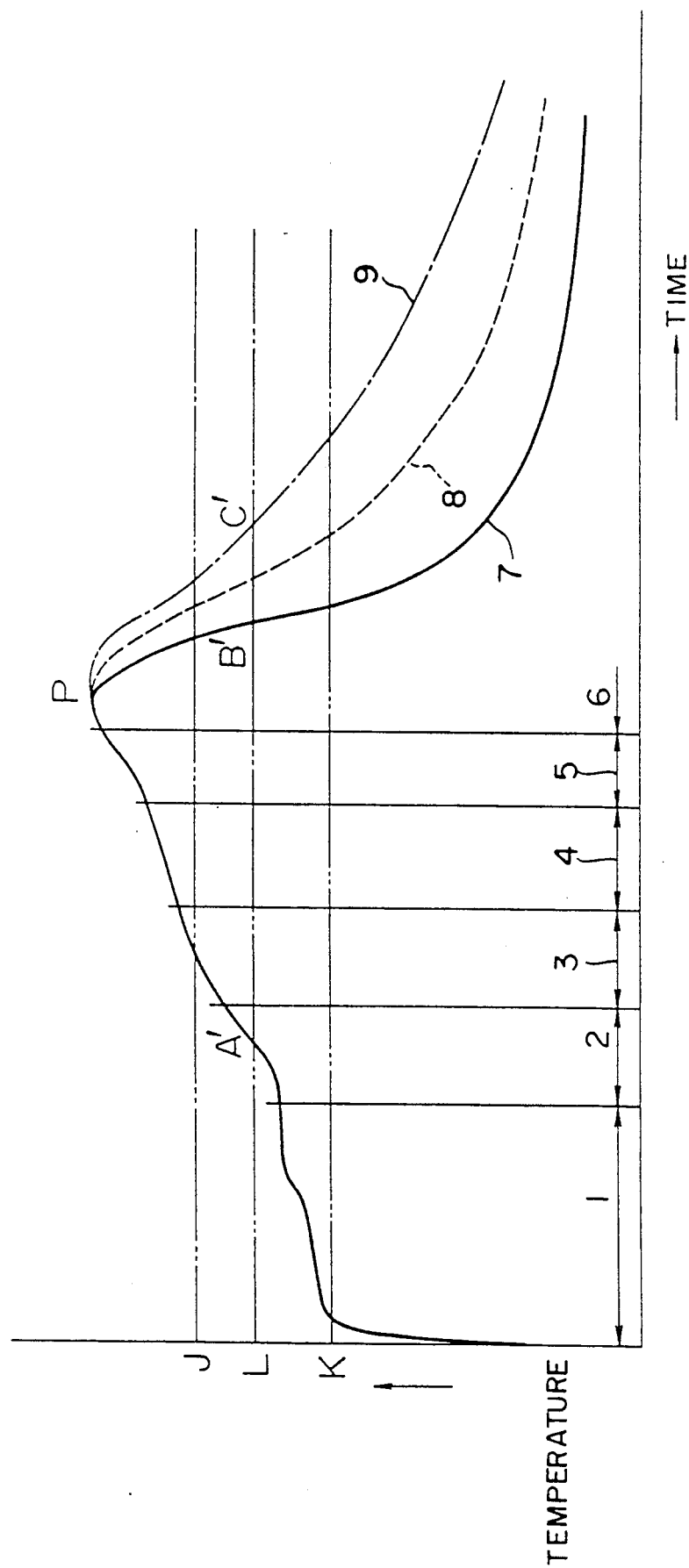
FIG. 8 is a diagram showing the relation between the temperature changes in a heating cylinder and the metal mold.

Next, FIG. 8 shows temperature changes in the heating cylinder and in the metal mold.

It is noted that, in FIG. 8, a reference character J represents the melting point of the coating material, a reference character K represents the melting point of the molding material, and a reference character L represents the foaming point of the foaming agent.

Further, in FIG. 8, reference characters 4', 5' and 6" represent a range of temperature change exhibited within the screw 1, a range of temperature change exhibited while passing through the nozzle 3, a range of temperature change exhibited while passing through the sprue 7, a range of temperature change exhibited while passing through the runner 9, a range of temperature change exhibited while passing through the gate 10, and a range of temperature change exhibited while the molding material is being filled into the mold and in the process of shrinkage, respectively.

In addition, a solid line 7' indicates the temperature change of the part of the molding material exiting close to the skin of the metal mold, a broken line 8' indicates the temperature change of the foaming substance inside the coating agent in terms of the threshold of foaming reaction, and the one-dot chain line 9' indicates the temperature change of the part of the molding material which forms the inner part of the molded product.

In the step of cooling and solidification mentioned above, although the resin 113 is molten within the screw 101 provided in the heating cylinder 102 because the melting point of the resin 113 serving as the molding material is represented by K, the coating agent 30 and the foaming substance 31 do not reach their reaction temperature, as seen in the range 1', since air is made to flow through the blower air passages 112 to absorb the heat generated by the shearing. By injecting, into the metal mold, the molten resin and the foaming agent which have been mixed and kneaded with each other, the temperature is increased while passing through the nozzle 103 as seen in the range 2', the temperature change exhibited while passing through the sprue 107 is as shown in the range 3', the temperature change exhibited while passing through the runner 109 is as shown in the range 4', the temperature change exhibited while passing through the gate 10 is as shown in the range 5', and the temperature change exhibited while filling the product molding portion in the metal mold and after the completion of filling into the product molding portion is as shown in the range 6'.

More specifically, the part of the resin existing close to the metal mold exhibits the temperature change indicated by the solid line 7', the gradually cooled part of the resin existing in the inner part of the product molding portion in the metal mold, which acts as the cause for the depression, exhibits the temperature change as indicated by the one-dot chain line 9', and the threshold of thermal work done that causes the coating agent 30 of the foaming agent 32 to become molten to start the reaction is exhibited as the temperature change indicated by the broken line 8'. Accordingly, the foaming reaction takes place at temperatures indicated by the one-dot chain line 9' above the broken line 8', while no foaming reaction takes place at temperatures indicated by the solid line 7' below the broken line 8'. Namely, the thermal work done achieves temperatures above the foaming point L of the foaming agent in the part of the resin existing close to the skin of the metal mold which corresponds to an area which is surrounded by points A', P and B' so that no foaming is effected, while the thermal work done achieves temperatures above the foaming point L of the foaming agent in that part of the resin existing in the inner part of the metal mold which corresponds to an area, which is surrounded by the points A', P and C', so that foaming is effected.

In this way, since the molding can be effected in the non-foamed state during and immediately after the filling of the resin into the product molding portion in the metal mold, it is possible to form products having a complicated configuration, such as a small-thickness portion or projection and, furthermore, it is possible to obtain molded products having a neat appearance.

In addition, as measures for preventing the occurrence of depression which might otherwise be caused due to the phenomenon that the gradually cooled part of the resin pulls down the rapidly cooled part of the resin after the gate is sealed, the gate 1 10 is enlarged and the injection pressure is increased, and accordingly, it is possible to lessen fin and camber as well as depression.

Furthermore, since foaming takes place only locally, it is possible to remarkably reduce the cycle time in comparison with the case of ordinary foaming Incidentally, in the present embodiment, while the molding material 113 and the coated foaming agent 32 have been described as being put into the hopper 115 separately from each other, however, the foaming agent 32 may be mixed into the molding material 113.

Figure 9:
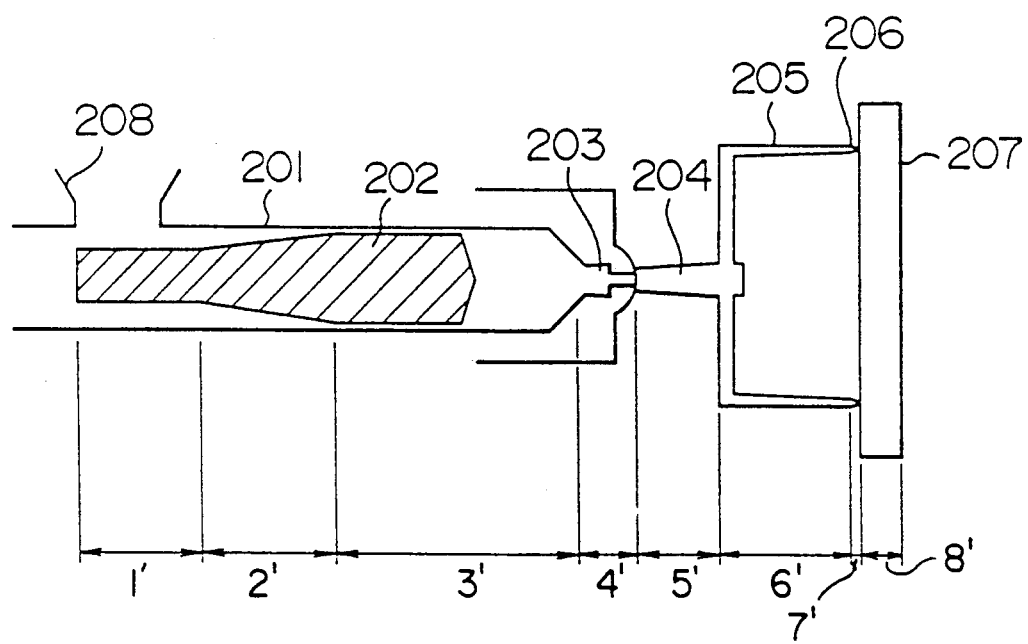
FIG. 9 is a front view illustrating an outline of a fourth embodiment of the injection molding machine for carrying out present invention.

FIG. 9 is a schematic view illustrating a fourth embodiment of an injection molding machine for carrying out the present invention, in which a reference numeral 201 denotes an injection heating cylinder; 202, a screw; 203, a nozzle; 204, a sprue; 205, a runner; 206, a gate; and 207, a product molding portion of the metal mold, these elements constituting all together a molding machine body.

A hopper 208 for supplying resin serving as molding material and foaming agent is attached to the molding machine body described above.

As for the foaming agent referred to above, foaming agent of the type that the temperature and holding time at that temperature required for starting the foaming reaction are adjusted in accordance with the difference in the cooling rate of the molten resin filled in the product molding portion 207 of the metal mold, that is, in such a manner that no foaming takes place at the temperature of that part of the resin whose cooling rate is high (corresponding to the temperature of the rapidly cooled part of the resin), while foaming takes place at the temperature of another part of the resin whose cooling rate is low (corresponding to the temperature of the gradually cooled part of the resin), is used.

Specifically speaking, foaming agent of the type which does not start its foaming reaction as long as the foaming agent itself is not heated to an elevated temperature (or the temperature of the part of the resin the cooling rate of which is low) (such as hydrazinedicarbonamide the decomposition temperature of which is 245° C. or azodicarbonamide the decomposition temperature of which is 205° C.), is used, for example.

Next, the operation of the injection molding according to this embodiment will be explained.

Referring to FIG. 9, the product molding portion of the metal mold is first clamped and, then, the molding material (pellets) and the foaming agent are sent from the hopper 208 so as to be mixed and kneaded with each other in the heating cylinder 201 due to the rotation of the screw 202, and thereafter, the molten resin and the foaming agent are injected through the nozzle 203.

Then, the molten resin mixed with the foaming agent is poured under pressure into a cavity which is not shown and, after that, the molten resin mixed with the foaming agent and filled in the cavity, which is not shown, is cooled and solidified in accordance with the general method of the prior art and is thereafter released from the mold.

Incidentally, in FIG. 9, reference characters 1', 2", 3', 4', 5', 6', 7'and 8'represent the supply area of the screw, the compression area of the screw, the measuring area of the screw, the nozzle area, the sprue area, the runner area acting also as a second sprue area, the gate area, and an area of the product molding portion of the metal mold, respectively.

Figure 10:
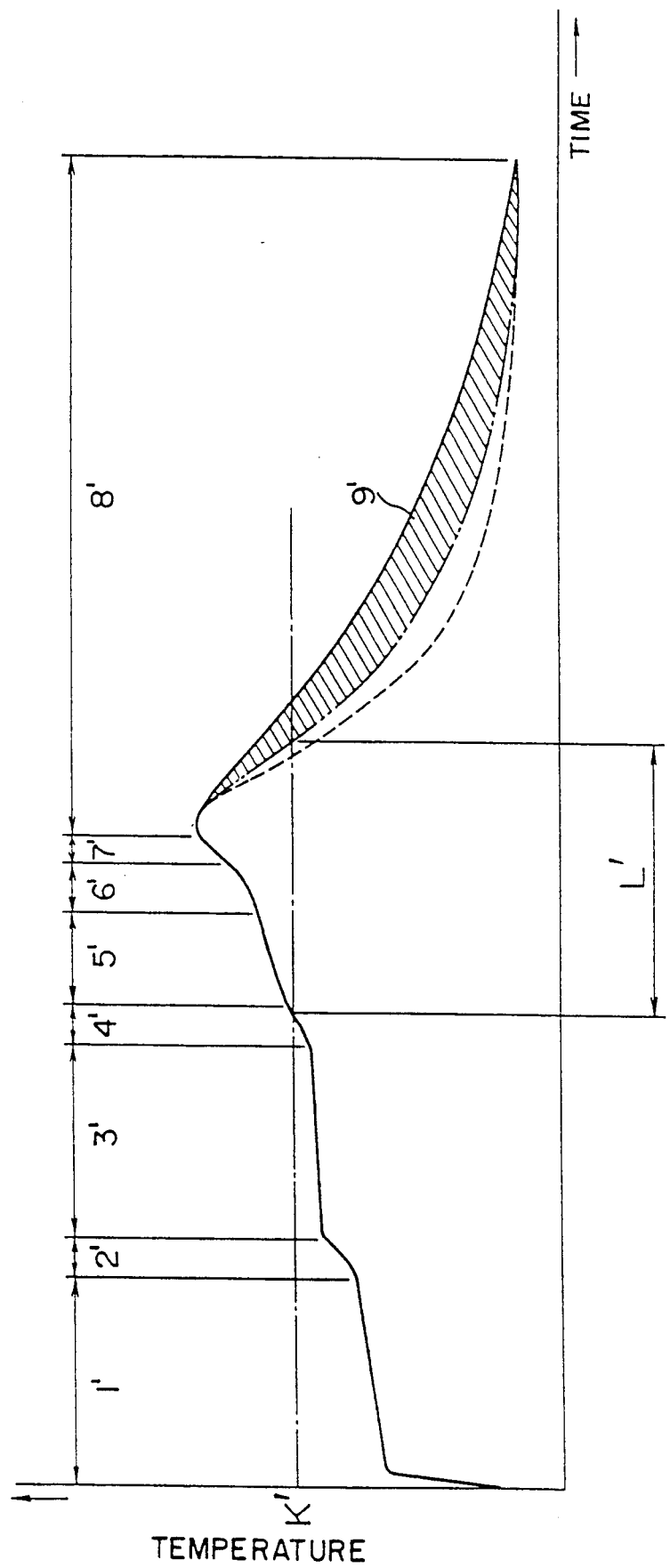
FIG. 10 is a diagram showing the relation between the progress of temperature change of the resin and foaming agent during injection filling of the mold and cooling of the molded article.

Further, reference characters 1', 2', 3', 4', 5', 6', 7', and 8' shown in FIG. 10 represent the progress of temperature changes of the resin and the foaming agent in correspondence with the areas represented by the same reference characters, respectively, in FIG. 9. In addition, reference characters 9', K', and L' represent a foaming range, the decomposition temperature of the foaming agent, and the time required to begin foaming, respectively.

Figure 11:
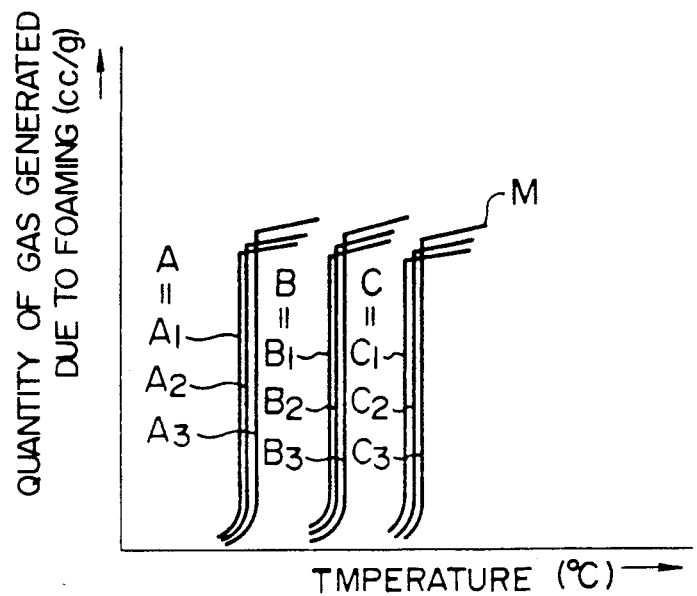
FIG. 11 is a diagram showing curves of gas quantity generated as a result of decomposition by heating depending upon temperature.

FIG. 11 shows curves of gas quantity generated as a result of decomposition by heating depending upon the temperature, in which reference characters A, B and C refer to the differences caused by changing the chemical constitution itself, reference characters $A_1$, $A_2$ and $A_4$ mean the difference due to fine adjustment made by mixing a promoter of the urea group, for example. Likewise, reference characters $B_1$, $B_2$, $B_3$ and $C_1$, $C_2$, $C_3$ refer respectively to the differences due to mixing of the promoter. In addition, a reference character M represents the point at which complete foaming is achieved.

Figure 12:
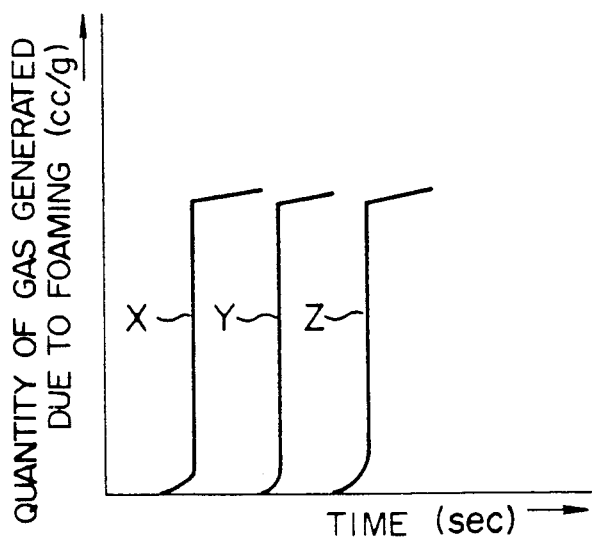
FIG. 12 is a diagram showing curves of gas quantity generated as a result of decomposition by heating depending upon time.

FIG. 12 shows curves of gas quantity generated as a result of the decomposition by heating of different foaming agents X, Y and Z depending upon time. It is understood from FIG. 12 that the time required for beginning foaming is adjustable.

In the step of cooling and solidification mentioned before, since the temperature in the screw 202 of the heating cylinder 201 is lower than the decomposition temperature K' of the foaming agent, as shown in the second ranges 1', 2'and 3', no foaming takes place. When injected into the metal mold, the temperatures of the resin and the foaming agent are increased due to exothermic heat generated by shearing. However, since holding time is required to start foaming as shown in FIG. 12, foaming does not take place until immediately after the product molding portion 207 is filled up but takes place after a lapse of time L' which is required for starting foaming in the gradually cooled region within the metal mold only in correspondence with the foaming range 9' shown in FIG. 10.

More specifically, since the thin portion close to the surface of the metal mold is cooled rapidly, as indicated by a broken line shown in FIG. 10, the foaming agent does not come to be molten but rather is solidified in a body with the resin without effecting any foaming reaction. In consequence, the appearance of the molded product can be kept neat, as is the case of the molding of non-foamed plastics and, in addition, there is no fear that the strength of the molded product is deteriorated. On the other hand, in the gradually cooled region of large thickness, since the temperature does not decrease because the cooling is effected gradually, the foaming agent is molten to start foaming as indicated by the foaming range 9' shown in FIG. 10. Owing to the foaming pressure produced during such foaming, it is possible not only to make it difficult for a depression to occur, which might otherwise be caused in the molding of ordinary non-foamed plastics as a result of withdrawal of the previously solidified portion due to the shrinkage of the inner part of the resin upon cooling, but also to reduce the pressure needed to fill the metal mold, with the result that it is possible to decrease fin and camber.

INDUSTRIAL AVAILABILITY

According to the present invention, it is possible to obtain molded products of foamed plastics the appearance of which is neat and the strength of which is not deteriorated. Further, since it is possible to prevent the occurrence of unwanted depressions without applying excessively high injection pressure (or hold pressure), which has been applied in the prior art, there is no need to fill the resin in such a manner that an excessively high internal pressure is produced in the mold, with the result that the occurrence of fin can be reduced. In consequence, the present invention is favorable to the molding of precision parts which abound in small parts, and, at the same time, the invention has the advantage of wide applicability from small machines to large machines. Accordingly, the present invention is applicable to the injection molding, seal molding and the like for forming products other than transparent products and every kind of small-thickness product, such as containers.

What is claimed is:

1. An injection molding method comprising the steps of:
   (a) mixing a foaming agent, which begins foaming after being kept at a required temperature for a required time, into molten resin;
   (b) filling a mold with a sufficient amount of said molten resin mixed with said foaming agent to produce a molded product conforming to said mold;
   (c) cooling a first portion of said mixture, which forms an inner part of said molded product, at a low rate sufficient to cause foaming of said first mixture portion; and
   (d) cooling a second portion of said mixture, which is in contact with an inner surface of said mold, at a high rate sufficient to substantially prohibit foaming of said second mixture portion, thereby substantially eliminating undesired surface depressions and forming a substantially neat surface of the molded product, wherein said foaming agent has a structure in which a substance causing said foaming is coated with a coating agent and said foaming agent is mixed into said molten resin immediately before said molten resin is filled into said mold.

2. An injection molding method according to claim 1, wherein said substance causing said foaming is composed of azodicarboxylicacidamide.

3. An injection molding method according to claim 1, wherein said substance causing said foaming is composed of sodium bicarbonate.

4. An injection molding method according to claim 1, wherein said substance causing said foaming is composed of hydrazinedicarbonamide.

* * * * *